Aug. 8, 1939.     R. LAWRY     2,168,352
COLOR-COMPARING DEVICE
Original Filed Sept. 24, 1934
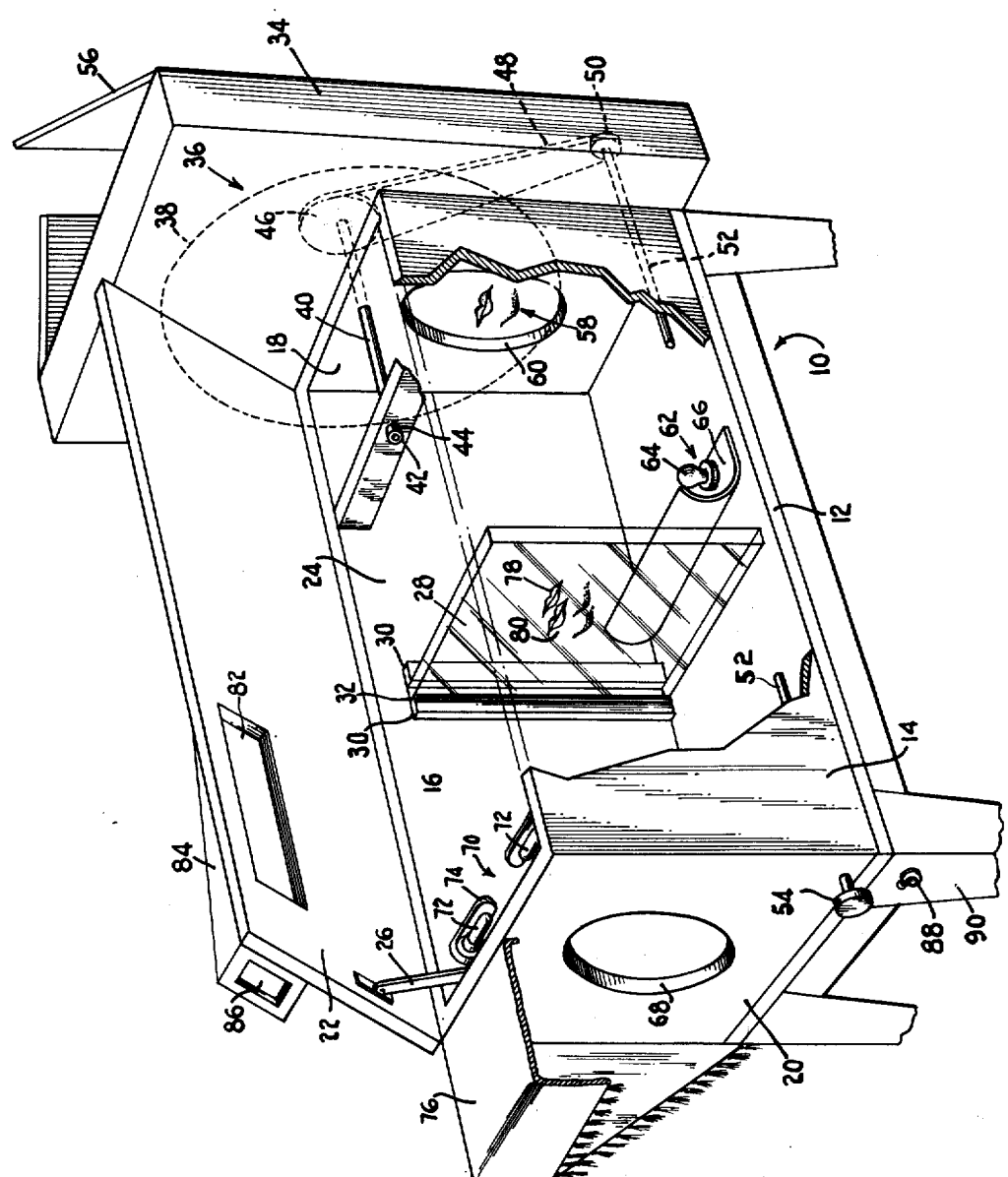
INVENTOR
ROLLA LAWRY
BY
*Henry L. Burkitt*
ATTORNEY Patented Aug. 8, 1939

2,168,352

UNITED STATES PATENT OFFICE 2,168,352

COLOR-COMPARING DEVICE

Rolla Lawry, Tucson, Ariz., assignor to Joseph M. Gross, Rockville Centre, Long Island, N. Y.

Application September 24, 1934, Serial No. 745,354
Renewed May 14, 1938

15 Claims. (Cl. 35—59)

This invention relates to color-comparing devices.

To a purchaser of a brand of coloring cosmetics which she has not previously used, the problem which presents itself includes the question of a selection of a proper shade. It is well understood that one color applied to skins of different shades has entirely different resultant effects. However, the necessity for making a direct application of a number of differently shaded cosmetics in order to arrive at any such determination is hardly desirable.

It is an object of the invention to provide apparatus to make possible the testing of color shades of cosmetics in relation to the features of such a person without any necessity for application of any such cosmetic, or of anything, for that matter, directly to the skin of such a person. The apparatus makes it possible to visualize one's appearance as it will actually be if the cosmetic be applied in proper manner.

It is an object of the invention to provide apparatus by which, to an observer, there is presented a composite image from which such a determination may be made.

For obtaining certain of the results incident to this invention, there is utilized a property of light by which a person may bring together, as, for instance, upon a screen, an image of herself and another image in such manner that both images can then be view simultaneously and as one image, by such person. This person thus may determine, directly and without the necessity for any actual application of cosmetics to her features, her appearance if she had made such an application.

In the construction herein described, the screen is positioned in the direct line of vision of such person. An association of lighting and image-producing elements is so arranged with relation to the screen and the individual concerned that simultaneously there will be depicted upon the screen, an image of this person and of the image-forming elements, so associated that, to the eyes of the person, there will be imparted the appearance of a single image.

The apparatus is useful for many purposes. One for which it is expressly designated is in connection with the selection of the proper shade of lip or face rouge. With substantially minor, or even without, change, the apparatus lends itself to use both for instructive and amusement purposes as the two images, appearing to the view of the individual, make it possible for her to determine without necessity for measurement or otherwise, the relationship the contouring and shading of her face bear to those of some other persons whose images are reproduced on the screen by the apparatus.

Other objects of this invention will hereinafter be set forth, or will be apparent from the description and the drawing, in which is illustrated a device by which certain principles of the invention may be exemplified.

The invention, however, is not intended to be restricted to any particular construction or arrangement of parts, or to any particular application of any such construction, or to any specific manner of use, or to any specific method of procedure therewith, or to any of various details thereof, herein shown and described, as the same may be modified in various particulars, or be applied in many varied relations, without departing from the spirit and scope of the claimed invention, the devices herein illustrated and described being possible forms which the invention may take.

On the drawing, in which is disclosed such a device:

The figure is a perspective view of a cabinet in which is represented apparatus embodying certain features of the invention, the top wall of the cabinet being shown moved to open position, a wall and other portions of the construction being broken away to illustrate certain details thereof.

The invention is illustrated in association with a cabinet 10 which may be made up in any desired manner. Such a cabinet may have a bottom wall 12, side walls 14 and 16, a rear wall 18, and a front wall 20. If desired, top wall 22 may be supported in any desired manner so that it may be opened, to permit inspection of chamber 24 of the cabinet and of the apparatus therein contained. For this purpose, top wall 22 may be hingedly secured to side wall 16, so that it may move toward and away from the top edges of walls 14 and 16. In this case, a gravity-actuated link-support-catch 26 may be provided, and be carried from top wall 22, to be effective automatically when wall 22 is raised, in the usual manner of such catches, then operating to retain top wall 22 in open position. Release may be effected manually.

Substantially medially of chamber 24 may be positioned a screen 28. Means, such as cleats 30, secured in any desired manner on walls 14 and 16, may provide grooves 32 in which is received screen 28. Screen 28 may be of any suitable material of a transparent character, such as a piece of plate glass.

A casing 34, to provide a housing for an image-producing device 36, may be disposed in association with rear wall 18, or rear wall 18 may form a part of said casing. In this case, the device is shown in the form of a disk or similar member 38. The disk may be mounted in any desired manner so that its position may be changed. A suitable mounting for such purpose may be provided by a shaft 40, carried in suitable bearings in rear wall 18 and in a cross-bar 42 extending between walls 14 and 16. Collars 44 may be used to restrain shaft 40 against axial movement, thus locating the disk. A sprocket 46 may be mounted upon shaft 40 to be driven by a chain 48 also carried around a sprocket 50. The latter sprocket may be secured to a shaft 52, provided suitable bearings in walls 18 and 20. Thus, upon manipulation of means, such as a knob 54, disk 38 may be caused to rotate. Casing 34 may be made accessible by means of doors 56, so that disk 38 may be changed at will, or so that otherwise access to the parts of the design-forming means may be facilitated.

Upon disk 38 may be arranged image-forming devices, such as designs 58, which may be photographs, paintings, or the like, as, for instance, of human features. These designs, as the disk rotates, are successively made visible through an opening 60 in rear wall 18, which opening may be suitably shaped to make visible only a selected portion of disk 38. Thus, by properly controlling the rotation effected by knob 54, any one of designs 58 depicted upon disk 38 may be positioned at opening 60.

Immediately facing, and located so that the light rays therefrom will be directed toward, opening 60, is illuminating means 62. Means 62 preferably is located on the side of screen 28 toward opening 60, and may include elements such as electric lamps 64 and a proper reflector 66. In this case, means 62 is disposed on bottom wall 12, and below opening 60. The light derived from means 62 is such that an image will be reflected upon screen 28 from a design 58 at opening 60, and will be apparent to one peering through opening 68 in front wall 20. Openings 60 and 68 may be substantially in axial alignment, and approximately of the same size and contouring.

The face of a person disposed at opening 68 may receive rays from illuminating means 70. In this case, means 70 includes electric lamps 72 and proper reflectors 74, located immediately over opening 68, and mounted from wall 20. The direction of rays from means 70 is such that an image of the face of the person at opening 68 will be reflected by screen 28 back to the eyes of the person. At front wall 20, a suitable canopy 76 may be provided to guard against stray rays entering the cabinet through opening 68. The inner faces of the walls of the cabinet may be black for light-absorbing purposes, to prevent reflection of light rays. Illuminating means 62 and 70 may be located otherwise than as here stated so long as the desired image formation is produced. It has been found that, when the illumination of the face, as derived from means 70, exceeds the illumination of design 58, as effected by means 62, a more effective visualization of the images, as here to be described, follows:

The disposition of screen 28 with relation to openings 60 and 68 is such that images 78 and 80, shown as if formed at opposed sides of screen 28, will actually appear as one image to the person at opening 68. Thus, that person will get a composite picture of the two images. In this manner, say that lips are the design at 58, and have been shaded a predetermined color. If light derived from the illuminating means is of the same character as that under which lips to which such coloring has been applied will be viewed, the person at opening 68, viewing in superimposed relation images 78 and 80, that is, the image of lip design 58 properly colored, and the image of her own lips, will see a composite result, depicting for her eyes the coloring which would be produced if such a color were applied to her lips. The particular shade of lip-rouge appealing to an individual may thus be quickly determined without any application of rouge to her lips, as designs 58 may be varied in accordance with the types of rouge in use or on sale. It is, of course, readily apparent that such composition of colors may be useful in connections other than with the lips, as, for instance, the cheeks.

In order that a second observer may observe disk 38 and screen 28, a peep-hole 82 may be arranged in association with top wall 22. This peep-hole, cut through the top wall, has a guard casing 84 disposed in relation thereto. A window 86 makes it possible for the observer to see what is occurring within the cabinet. A switch 88 on an upright 90 supporting the cabinet may provide for control of the illuminating means therein contained.

The apparatus also provides means whereby a person, at opening 68, may compare her features with those of some individual, by having the features of the individual depicted as a design 58, upon disk 38. When such a design is made visible at opening 60, its image is reflected to the screen, where it may be viewed superimposed upon the image of the person at opening 68. She may thus, without any difficulty, instantly compare the contours and different shadings of portions of her features with those of the individual whose image appears in the selected design 58.

Many other changes could be effected in the particular devices designed, and in the methods of operation set forth, and in specific details thereof, without substantially departing from the invention intended to be defined in the claims, the specific description herein being merely to exemplify the invention.

What is claimed as new and useful is:—

1. In apparatus of the character described, a casing having an opening at one end thereof, a transparent member positioned intermediately of the casing, means to cause the projection upon the member of an image of a face positioned at the opening, an image-presenting comparison member, and means in the casing for simultaneously projecting upon the transparent member an image from the comparison member so that both images are simultaneously visible to one whose face is positioned at the opening.

2. Apparatus for effecting the simultaneous disposition of images to permit their comparison by one viewing them, one of the images being that of the person viewing the same, the apparatus including a casing, the casing having an opening at one end thereof, the casing having a surface for depicting the image thereon, the surface being screen in spaced relation to the opening, means in the casing for disposing an image-forming means with relation to the surface so that an image from the image-forming means will be formed on the surface, and illuminating means in the casing for simultaneously directing images upon the surface from the face of the one viewing the images through the opening and from the image-forming means.

3. In apparatus of the character described, a casing having an opening at one end thereof, the casing being light-impervious except for said opening, a transparent member positioned intermediately of the casing, means to cause the projection upon the member of an image of a face positioned at the opening, an image-presenting comparison member, and means in the casing for simultaneously projecting upon the transparent member an image from the comparison member so that both images are simultaneously visible to one whose face is positioned at the opening.

4. In apparatus of the character described, a casing having an opening at one end thereof, a transparent member positioned intermediately of the casing, means to cause the projection upon the member of an image of a face positioned at the opening, an image-presenting comparison member, and means in the casing and on the side of the transparent member removed from the opening for simultaneousuly projecting upon the transparent member an image from the comparison member so that both images are simultaneously visible to one whose face is positioned at the opening.

5. In apparatus of the character described, a casing having an opening at one end thereof, a transparent member positioned intermediately of the casing, means to direct light rays upon a face positioned at the opening to cause the projection upon the member of an image of said face, an image-presenting comparison member, and means in the casing for simultaneously projecting upon the transparent member an image from the comparison member so that both images are simultaneously visible to one whose face is positioned at the opening.

6. In apparatus of the character described, a casing having an opening at one end thereof, a transparent member positioned intermediately of the casing, means to direct light rays upon a face positioned at the opening to cause the projection upon the member of an image of said face while permitting unobstructed inspection by one at the opening of the image upon the member, an image-presenting comparison member, and means in the casing for simultaneously projecting upon the transparent member an image from the comparison member so that both images are simultaneously visible to one whose face is positioned at the opening.

7. In apparatus of the character described, a casing having an opening at one end thereof, a transparent member positioned intermediately of the casing, means to cause the projection upon the member of an image of a face positioned at the opening, means for selectively arranging image-producing means in a predetermined relation to the member, and means in the casing for projecting upon the member an image from an arranged image-producing means so that both images are simultaneously visible to one whose face is positioned at the opening.

8. In apparatus of the character described, a casing having an opening at one end thereof, a transparent member positioned intermediately of the casing, means to cause the projection upon the member of an image of a face positioned at the opening, a plurality of delineations, means for selectively arranging one of the delineations in a predetermined relation to the member for the projection of the image of the delineation upon the member, and means in the casing for projecting upon the member an image of an arranged delineation so that both images are simultaneously visible to one whose face is positioned at the opening.

9. In apparatus of the character described, a casing having an opening at one end thereof, a transparent member positioned intermediately of the casing, means to cause the projection upon the member of an image of a face positioned at the opening, a carrier having thereon a plurality of delineations, means for adjusting the carrier selectively to arrange one of the delineations in a predetermined relation to the member for the projection of the image of the delineation upon the member, and means in the casing for projecting upon the member an image of an arranged delineation so that both images are simultaneously visible to one whose face is positioned at the opening.

10. In apparatus of the character described, a casing having an opening at one end thereof, a transparent member positioned intermediately of the casing, means to cause the projection upon the member of an image of a face positioned at the opening, a disk having depicted thereon a plurality of delineations, means for moving the disk to arrange one of the delineations selectively in a predetermined relation to the member for the projection of the image of the delineation upon the member, and means in the casing for projecting upon the member an image of an arranged delineation so that both images are simultaneously visible to one whose face is positioned at the opening.

11. Apparatus for effecting the simultaneous disposition of images to permit their comparison by one viewing them, one of the images being that of the person viewing the same, the apparatus including a casing, the casing having an opening at one end thereof and an exposure opening at the other end thereof, the casing having a surface for depicting an image thereon, the surface being in spaced relation to the openings, means in the casing for disposing an image-forming means at the exposure opening, and illuminating means in the casing for simultaneously directing images upon the surface from the face of the one viewing the images through the opening and from the image-forming means.

12. Apparatus for effecting the simultaneous disposition of images to permit their comparison by one viewing them, one of the images being that of the person viewing the same, the apparatus including a casing, the casing having an opening at one end thereof and an exposure opening at the other end thereof, the casing having a surface for depicting an image thereon, the surface being in spaced relation to the openings, a rotatable disk carrying a plurality of designs, the disk being mounted so that one of such designs may be made apparent through the exposure opening at any particular time, means for operating the disk to dispose any one of the designs selectively at the exposure opening, and illuminating means in the casing for simultaneously directing images upon the surface from the face of the one viewing the images through the opening and from the exposure opening.

13. Apparatus for effecting the simultaneous disposition of images to permit their comparison by one viewing them, one of the images being that of the person viewing the same; the apparatus including a casing; the casing having an opening at one end thereof and an exposure opening at the other end thereof; the casing having a surface for depicting an image thereon, the surface being in spaced relation to the openings; a rotatable disk carrying a plurality of designs, the disk being mounted so that one of such designs may be made apparent through the exposure opening at any particular time; means for operating the disk to dispose any one of the designs selectively at the exposure opening; and illuminating means in the casing for simultaneously directing images upon the surface from the face of the one viewing the images through the opening and from the exposure opening so that, to the person viewing, the image of the person viewing will appear superimposed upon the image of the design.

14. Apparatus for effecting the simultaneous disposition of images to permit their comparison by one viewing them, one of the images being that of the person viewing the same; the apparatus including a casing; the casing having an opening at one end thereof and an exposure opening at the other end thereof; the casing having a surface for depicting an image thereon, the surface being in spaced relation to the openings; a rotatable disk carrying a plurality of designs, the disk being mounted so that one of such designs may be made apparent through the exposure opening at any particular time; means for operating the disk to dispose any one of the designs selectively at the exposure opening; and illuminating means in the casing for simultaneously directing images upon the surface from the face of the one viewing the images through the opening and from the exposure opening so that, to the person viewing, the image of the person viewing will appear superimposed upon the image of the design; the illuminating means being disposed to direct no rays directly into the line of sight of the person viewing the screen.

15. Apparatus for effecting the simultaneous disposition of images to permit their comparison by one viewing them, one of the images being that of the person viewing the same; the apparatus including a casing; the casing having an opening at one end thereof and an exposure opening at the other end thereof; the casing having a transparent screen in spaced relation to the openings; a rotatable disk carrying a plurality of designs, the disk being mounted so that one of such designs may be made apparent through the exposure opening at any particular time; means for operating the disk to dispose any one of the designs selectively at the exposure opening; and illuminating means in the casing for simultaneously directing images upon the screen from the face of the one viewing the images through the opening and from the exposure opening so that, to the person viewing, the image of the person viewing will appear superimposed upon the image of the design; the illuminating means being disposed to direct no rays directly into the line of sight of the person viewing the screen.

ROLLA LAWRY.

CERTIFICATE OF CORRECTION.

Patent No. 2,168,352. August 8, 1939.

ROLLA LAWRY.

It is hereby certified that error appears in the printed specification of the above numbered patent requiring correction as follows: Page 1, first column, line 31, for the word "view" read viewed; line 55, after "determine" insert a comma; page 2, second column, line 72, claim 2, for "the" before "image" read an; line 73, same claim, strike out "screen"; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal)

that of the person viewing the same; the apparatus including a casing; the casing having an opening at one end thereof and an exposure opening at the other end thereof; the casing having a surface for depicting an image thereon, the surface being in spaced relation to the openings; a rotatable disk carrying a plurality of designs, the disk being mounted so that one of such designs may be made apparent through the exposure opening at any particular time; means for operating the disk to dispose any one of the designs selectively at the exposure opening; and illuminating means in the casing for simultaneously directing images upon the surface from the face of the one viewing the images through the opening and from the exposure opening so that, to the person viewing, the image of the person viewing will appear superimposed upon the image of the design.

14. Apparatus for effecting the simultaneous disposition of images to permit their comparison by one viewing them, one of the images being that of the person viewing the same; the apparatus including a casing; the casing having an opening at one end thereof and an exposure opening at the other end thereof; the casing having a surface for depicting an image thereon, the surface being in spaced relation to the openings; a rotatable disk carrying a plurality of designs, the disk being mounted so that one of such designs may be made apparent through the exposure opening at any particular time; means for operating the disk to dispose any one of the designs selectively at the exposure opening; and illuminating means in the casing for simultaneously directing images upon the surface from the face of the one viewing the images through the opening and from the exposure opening so that, to the person viewing, the image of the person viewing will appear superimposed upon the image of the design; the illuminating means being disposed to direct no rays directly into the line of sight of the person viewing the screen.

15. Apparatus for effecting the simultaneous disposition of images to permit their comparison by one viewing them, one of the images being that of the person viewing the same; the apparatus including a casing; the casing having an opening at one end thereof and an exposure opening at the other end thereof; the casing having a transparent screen in spaced relation to the openings; a rotatable disk carrying a plurality of designs, the disk being mounted so that one of such designs may be made apparent through the exposure opening at any particular time; means for operating the disk to dispose any one of the designs selectively at the exposure opening; and illuminating means in the casing for simultaneously directing images upon the screen from the face of the one viewing the images through the opening and from the exposure opening so that, to the person viewing, the image of the person viewing will appear superimposed upon the image of the design; the illuminating means being disposed to direct no rays directly into the line of sight of the person viewing the screen.

ROLLA LAWRY.

CERTIFICATE OF CORRECTION.

Patent No. 2,168,352.     August 8, 1939.

ROLLA LAWRY.

It is hereby certified that error appears in the printed specification of the above numbered patent requiring correction as follows: Page 1, first column, line 31, for the word "view" read viewed; line 55, after "determine" insert a comma; page 2, second column, line 72, claim 2, for "the" before "image" read an; line 73, same claim, strike out "screen"; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal)